INVENTORS.
Robert R. Wall
Donald L. Peterson

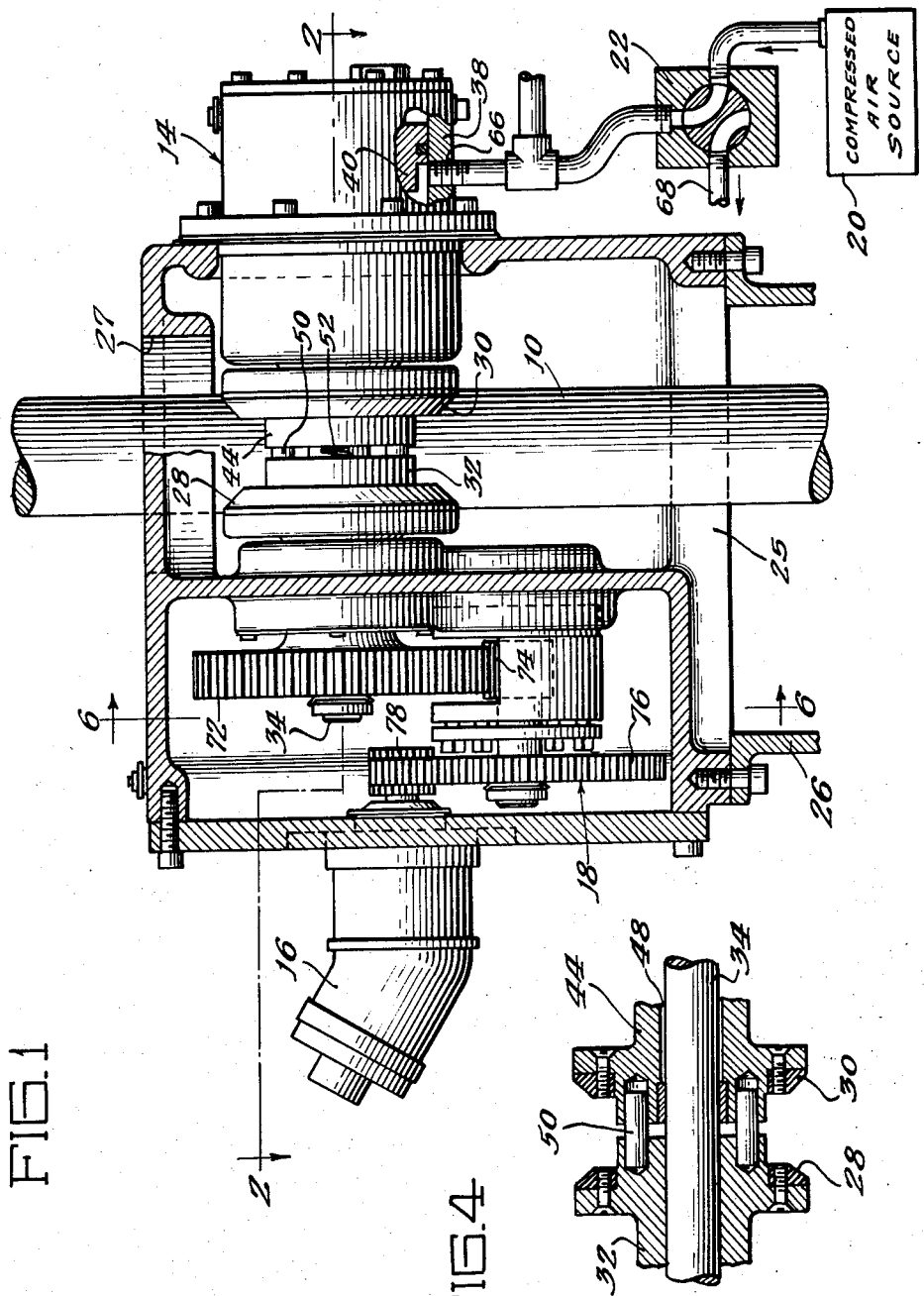

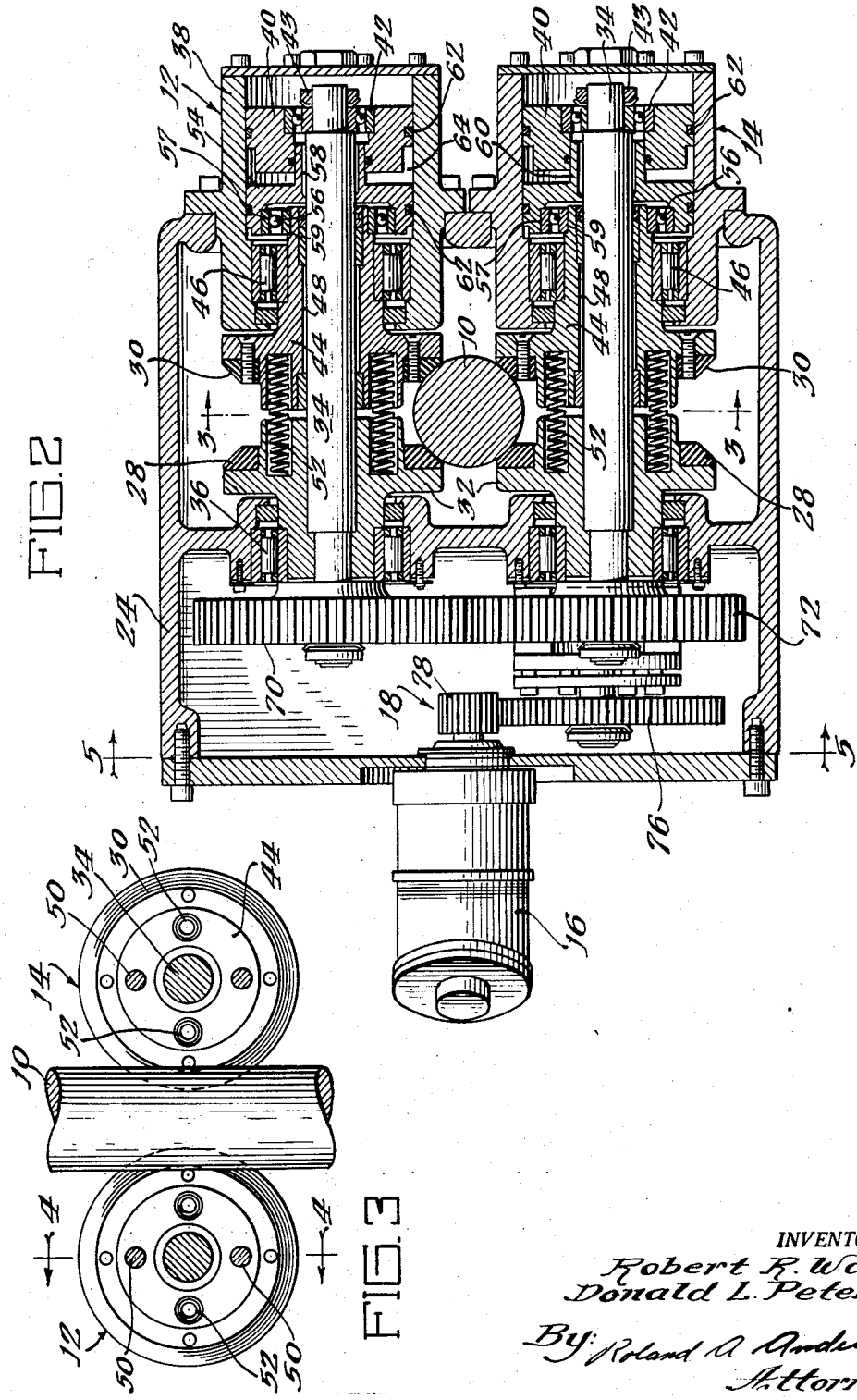

By: Roland G. Andrum
Attorney:

United States Patent Office 2,904,168
Patented Sept. 15, 1959

2,904,168

POSITIONING DEVICE

Robert R. Wall and Donald L. Peterson, Richland, Wash., assignors to the United States of America as represented by the United States Atomic Energy Commission Application August 13, 1951, Serial No. 241,534

4 Claims. (Cl. 203—260)

The present invention relates to a device for positioning an elongated element which is adapted to release the element rapidly.

It has become common practice to control nuclear reactions by inserting an element into the reaction to change at least one of the critical conditions which make possible a self-sustaining nuclear reaction. For control purposes, many of the neutronic reactors are provided with elongated elements constructed of material having high neutron capture cross sections which are positioned partially within the active portion of the reactor, while other neutronic reactors have fuel elements which may be translated with respect to other elements within the active portion of the reactor. The present positioning device may be used in connection with either type of reactor control. It has been particularly designed for use in vertically translating an elongated neutron absorbing element in the shape of a cylindrical rod, but the inventive concept may equally well be employed in other types of apparatus.

While many devices have been developed for the purpose of positioning control elements in a neutronic reactor, for example the devices disclosed in the application of Abbott Allen, Serial No. 582,091, filed March 10, 1945, and McCorkle Patent No. 2,756,857, issued July 31, 1956, most of these devices have been of primary utility for either accurately positioning a control element over a limited range or impelling the element to achieve safety control, but have had little value in accomplishing both purposes with a single element. In the operation of most neutronic reactors, the power level of the reactor is maintained at a constant level by making small accurate adjustments of a control element. However, due to rapid or unexpected changes in conditions, it must be possible to rapidly move a safety element in order to prevent an explosive reaction from developing. It is an object of the present invention to provide a positioning device for moving an element accurately over small distances and which is adapted to release the element so that it may be rapidly impelled.

It is also an object of the present invention to provide a positioning device which may be readily constructed to be mechanically reliable, and which may be constructed to fail safe in the event of mechanical failure.

Further objects and advantages of the present invention will become apparent from a further study of this subject matter, particularly when considered in the light of the drawings in which:

Figure 1 is principally a sectional view of the positioning device, portions of the device being illustrated schematically;

Figure 2 is a sectional view of the positioning device taken along line 2—2 of Figure 1;

Figure 3 is a sectional view taken along line 3—3 of Figure 2;

Figure 4 is a sectional view of a portion of the device taken along line 4—4 of Figure 3;

Figure 5:
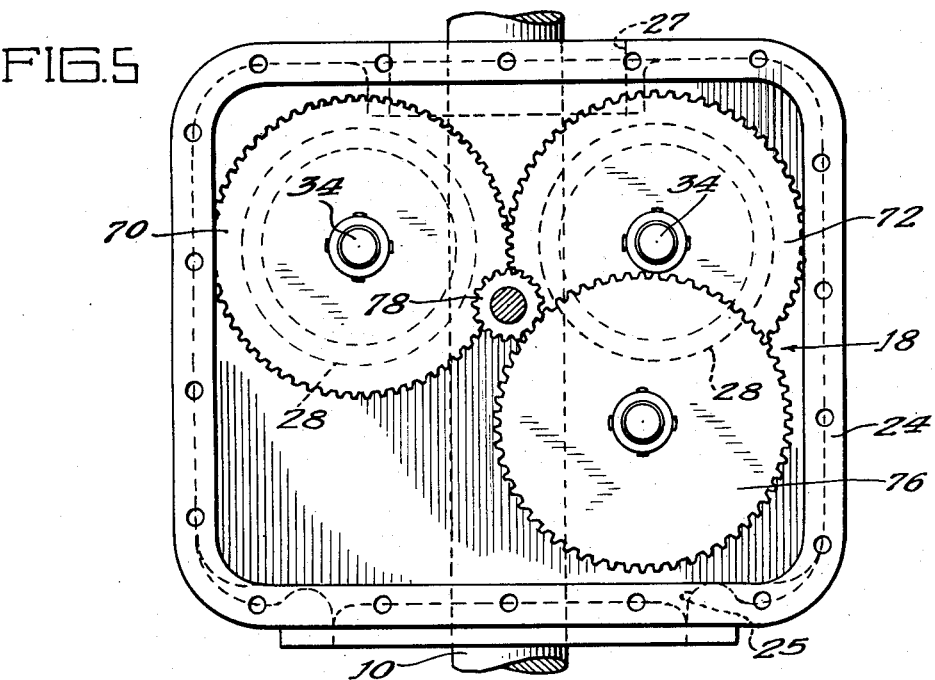
Figure 5 is a sectional view taken along line 5—5 of Figure 2.
Figure 6:
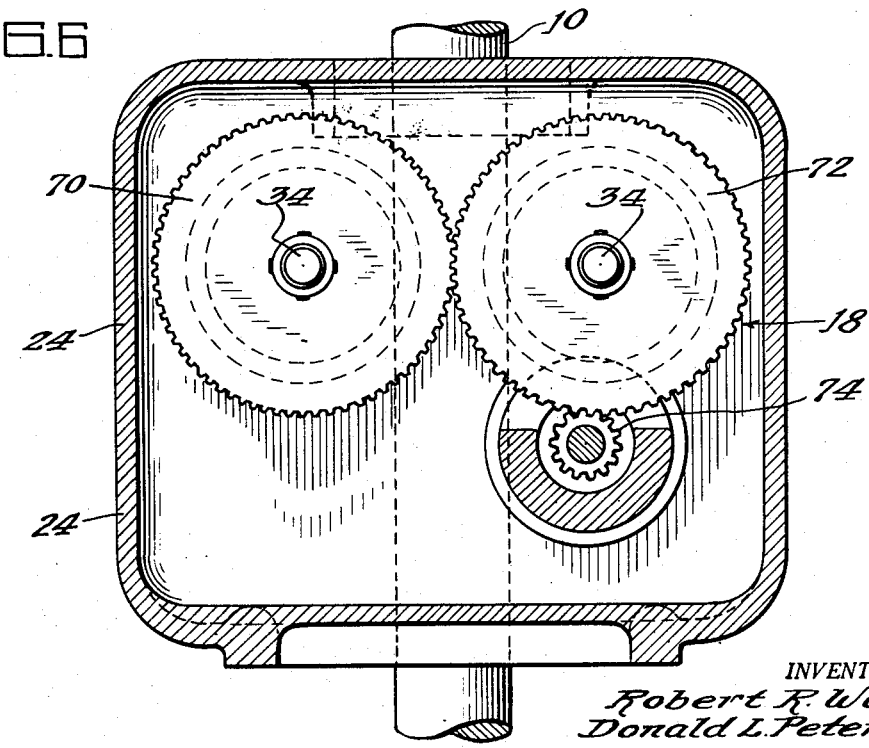
Figure 6 is a sectional view taken along the line 6—6 of Figure 1.

As generally indicated in Figures 1 and 2, the rod 10 which is to be positioned is vertically clamped between two rod clamping assemblies 12 and 14, and the rod clamping assemblies 12 and 14 are provided with rotatable portions driven in opposite directions by means of a reversible motor 16 coupled to the assemblies 12 and 14 through a gear train 18. The rod clamping assemblies 12 and 14 clamp the rod 10 in response to a fluid pressure supplied by a compressed air source 20, or other source of fluid pressure, which is coupled to both of the rod clamping assemblies 12 and 14 through a valve 22.

The rod clamping assemblies 12 and 14, the motor 16 and the gear train 18 are mounted to a housing 24 which is provided with apertures 25 and 27 through which the rod 10 may be disposed. The housing 24 is adapted to be mounted over an aperture in a neutronic reactor into which the rod 10 is to reciprocate by any suitable means such as brackets 26, the rod 10 being vertically disposed.

The rod clamping assemblies 12 and 14 are identical, and the two assemblies will be described together. Each rod clamping assembly is provided with a pair of friction discs 28 and 30 which are mounted to engage the rod 10. The friction disc 28 is affixed to a rotating hub 32 which in turn is affixed to a shaft 34. One end of the shaft 34 is rotatably mounted to the housing 24 by means of roller bearings 36 disposed between the hub 32 and the housing 24. A cylindrical casing 38 is disposed about the other end of the shaft 34 and affixed to the housing 24. A circular bearing mount 40 is slidably sealed to the casing and provided with ball bearings 42 which are journaled about the end of the shaft 34. A lock nut 43 prevents the bearing mount 40 from sliding off of the shaft 34.

A floating hub 44 is disposed to rotate within the casing 38 upon roller bearings 46. The floating hub 44 is provided with an axial bore 48 with a diameter slightly greater than the diameter of the shaft 34. The shaft 34 is disposed within the bore 48, so that the floating hub 44 is free to slide axially along the shaft 34. One of the friction discs 30 is disposed about the periphery of the floating hub 44, and confronts the other friction disc 28 which is disposed about the periphery of the hub 32.

As shown in Figures 2 through 4, the floating hub 44 is coupled to the hub 32 by means of pins 50 which are rigidly attached to the hub 32 and slidable within apertures 51 in the hub 44, thereby permitting the distance between the hubs 32 and 44 along the axis of the shaft 34 to vary and requiring the two hubs 32 and 44 to rotate together about the shaft 34. Springs 52 are also disposed between the hubs 32 and 44 and force the hubs 32 and 44 apart.

A piston 54 is disposed within the casing 38 between the floating hub 44 and the bearing mount 40, and is rotatably mounted about the floating hub 44 by means of ball bearings 56. The ball bearings 56 are disposed between a groove 57 in the piston 54 and a groove 59 in the floating hub 44. The piston 54 has a central aperture 58 with a diameter slightly larger than the diameter of the shaft 34 disposed about the shaft 34, and the piston 54 is provided with a protruding sleeve 60 disposed about the shaft 34 and extending into the bearing mount 40. The bearing mount 40 is sealed to the casing 38 and the sleeve 60 by means of sealing rings 62, and the piston 54 is sealed to the casing 38 by a similar sealing ring 62. In this manner, a chamber 64 is formed between the bearing mount 40 and the sliding piston 54.

The chamber 64 of each of the rod clamping assemblies 12 and 14 is connected to the valve 22 through an aperture 66, shown in Figure 1. The valve 22 has two positions, one connecting the compressed air source 20 to the chambers 64, and the other connecting the chambers 64 to a vent 68 disposed in the ambient atmosphere.

The shafts 34 in the two rod clamping assemblies 12 and 14 are rotated in opposite directions by means of the gear train 18. Two spur gears 70 and 72 are affixed to the ends of the shafts 34 of the rod clamping assemblies 12 and 14 and meshed together, so that rotation of the one of the spur gears rotates the other about its axis in the opposite direction. The spur gear 72 which is affixed to the shaft 34 of the rod clamping assembly 14 is coupled to the motor 16 through gears 74, 76 and 78. The motor 16 is reversible and has continuously variable speed throughout its range.

Since the rod 10 is to fall by gravity when it is released from the friction discs 28 and 30, it must be vertically disposed, and in some cases it may be desirable to guide the rod 10 in this direction by some conventional means. The friction discs 28 and 30 on the two rod clamping assemblies 12 and 14 are positioned adjacent to the rod 10, and will only contact and clamp the rod 10 when the valve 22 connects the compressed air source 20 to the chambers 64 in both of the assemblies 12 and 14. The pressure in the chambers 64 forces the pistons 54 against the bearings 56, which in turn force the floating hubs 44 toward the hubs 32. In this manner, the friction discs 30 will be forced into contact with the rod 10 and the rod 10 becomes clamped between the discs 28 and 30. If the motor 16 is then operated, the rod 10 may be raised or lowered, depending upon the direction of rotation of the motor 16. Both friction discs 28 and 30 in each of the assemblies 12 and 14 will rotate at the same rate, because they are interconnected by the pins 50. If the valve 22 is turned connecting the chambers 64 of the rod clamping assemblies 12 and 14 to the ambient atmosphere, or the supply of compressed air fails, the springs 52 between the hubs 32 and the floating hubs 44 will force the floating hubs 44 away from the hubs 32, thereby releasing the rod 10 and permitting it to fall by gravitational attraction.

It is to be noted, that the use of floating hubs 44 and hubs 32 affixed to the shafts 34, and pneumatic clamping devices to clamp the rod 10 between the hubs 32 and 44 constitutes a structure in which the friction discs 28 and 30 are self-aligning. Also, this structure provides sufficient flexibility to compensate for wear or irregularities in the rod 10.

It has been found that the friction discs 28 and 30 should be constructed of a soft, non-work hardenable material, such as aluminum. The motor 16 may be electric or hydraulic. In the latter case, the gear train 18 will probably be required to provide greater gear reduction to permit the hydraulic motor to operate at relatively higher speeds. The gears in the gear train 18 may be constructed of brass or any other material conventionally used to construct gears. The hubs 32 and 44 may be constructed of cast iron or some other solid durable material, and the shafts 34 may be constructed of steel or other suitable solid durable material.

The man skilled in the art will clearly devise many other uses and modifications of the device described above, and hence it is intended that the scope of the present invention be not limited to the specific structure disclosed, but rather only by the appended claims.

What is claimed is:

1. A rod positioning device comprising, in combination, a housing, a pair of parallel shafts having one end rotatably mounted upon the housing, a cylinder disposed about the other end of said shafts and mounted to the housing, bearing means disposed about said end of the shafts sealed about their periphery to the cylinder, a friction disc rigidly affixed to each of the shafts adjacent to the end journaled within the housing, a second friction disc slidably disposed about each of the shafts adjacent to the first friction disc, pins slidably disposed between the first and second friction discs on each shaft, spiraled springs disposed between the first and second friction discs on each shaft, a piston slidably disposed about each of the shafts between the second friction disc and the bearing means, said piston being slidably sealed within the cylinder and mechanically linked to the second friction disc on said shaft, means to apply a fluid pressure within each cylinder between the piston and the bearing means, and means coupled to the shafts to rotate the shafts in opposite directions at approximately the same rate.

2. A rod positioning device comprising the elements of claim 1 wherein the means to rotate the shafts in opposite directions comprises a pair of meshed spur gears having the same diameter attached to one end of the shafts, a reversible motor, and means to couple the reversible motor to one of the spur gears.

3. A rod positioning device comprising a pair of parallel shafts, a hub rigidly affixed to each of said shafts, a floating hub slidably disposed about each of said shafts confronting the first hub, at least one pin slidably disposed between the hub and the floating hub on each shaft, said pin being disposed parallel to the shaft, a friction disk on each of the hubs on each of the shafts confronting each other, and means to drive the floating hub toward the stationary hub including a cylindrical casing disposed about the end of the shaft adjacent to the floating hub, a bearing mount disposed within the casing and sealed thereto, said bearing mount being journaled about the end of the shaft, a piston disposed about the shaft between the floating hub and the bearing mount, said piston being slidably sealed to the casing and abutting the floating hub, whereby injection of a fluid pressure between the piston and the bearing mount drives the floating hub toward the stationary hub.

4. A rod positioning device comprising, in combination, a pair of parallel shafts, a hub rigidly affixed to each of the shafts, a floating hub slidably disposed about each of said shafts confronting the first hub on the same shaft, at least one pin slidably disposed between the hub and the floating hub on each shaft, said pin being disposed parallel to the shaft, a friction disc on each of the hubs on each of the shafts, said friction disks on each shaft confronting each other, a cylindrical casing disposed about the end of each of the shafts adjacent to the floating hub, a bearing mount disposed within each of the casings and sealed thereto, said bearing mounts being journaled about the end of the shafts, a piston disposed about each of the shafts between the floating hub and the bearing mount, said pistons being slidably sealed to the casings and abutting the floating hubs, a source of fluid pressure, and means connecting the source of fluid pressure to each of the casings at a point between the bearing mount and the piston, said means including a two-position valve having one position vented to the ambient atmosphere.

References Cited in the file of this patent

UNITED STATES PATENTS

| | | |
|---|---|---|
| 488,390 | Gordon | Dec. 20, 1892 |
| 644,884 | Wrigley | Mar. 6, 1900 |
| 694,278 | Hoekstra | Feb. 25, 1902 |
| 752,997 | Ong | Feb. 23, 1904 |
| 2,064,453 | Wheeler | Dec. 15, 1936 |
| 2,161,044 | Heintz et al. | June 6, 1939 |